United States Patent
Doi et al.

(10) Patent No.: US 9,811,442 B2
(45) Date of Patent: *Nov. 7, 2017

(54) DYNAMIC TRACE LEVEL CONTROL

(71) Applicant: International Business Machines Corporation, Armonk, NY (US)

(72) Inventors: Masashi Doi, Yokohama (JP); Kenya Ishimoto, Machida (JP); Atsushi Naruse, Yamato (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/966,157

(22) Filed: Dec. 11, 2015

(65) Prior Publication Data

US 2017/0168917 A1    Jun. 15, 2017

(51) Int. Cl.
G06F 9/44 (2006.01)
G06F 11/36 (2006.01)

(52) U.S. Cl.
CPC ...... *G06F 11/3636* (2013.01); *G06F 11/3664* (2013.01)

(58) Field of Classification Search
CPC . G06F 11/364; G06F 11/3636; G06F 11/3664
USPC .......................................................... 717/128
See application file for complete search history.

(56) References Cited

U.S. PATENT DOCUMENTS

| 5,642,478 A * | 6/1997 | Chen | G06F 11/3495 714/25 |
| 7,506,314 B2 * | 3/2009 | Kollmann | G06F 11/3476 714/45 |
| 2002/0129300 A1 * | 9/2002 | Floyd | G06F 11/261 714/39 |
| 2004/0015880 A1 * | 1/2004 | Floyd | G06F 11/3636 717/128 |

(Continued)

FOREIGN PATENT DOCUMENTS

| JP | 2000020344 A | 1/2000 |
| JP | 2009205488 A | 9/2009 |
| JP | 2009223714 A | 10/2009 |

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Lewis A Bullock, Jr.
*Assistant Examiner* — Theodore Hebert
(74) *Attorney, Agent, or Firm* — Michael O'Keefe (57) ABSTRACT

A method for adjusting a filtering mechanism within a trace logging system. The method may include receiving a plurality of messages from a software program, whereby each of the plurality of messages includes a message logging level. The method may also include storing the plurality of received messages in a buffer. The method may further include determining an error has occurred within the software program. The method may also include identifying (Continued)

each of the plurality of stored messages that aid in debugging the determined error. The method may further include updating an alert status configuration based on the message logging level associated with each of the plurality of identified messages.

10 Claims, 8 Drawing Sheets

(56) References Cited

U.S. PATENT DOCUMENTS

| | | | | |
|---|---|---|---|---|
| 2009/0049342 A1* | 2/2009 | Dickenson | ........... | G06F 11/3636 714/45 |
| 2009/0119548 A1* | 5/2009 | Kollmann | ........... | G06F 11/3476 714/45 |
| 2009/0222492 A1* | 9/2009 | Yamauchi | ........... | G06F 11/3476 |
| 2009/0241096 A1* | 9/2009 | Borghetti | ............ | G06F 11/3409 717/128 |
| 2011/0067008 A1* | 3/2011 | Srivastava | .......... | G06F 11/3466 717/128 |
| 2011/0270957 A1* | 11/2011 | Phan | .................. | H04L 41/0622 709/221 |
| 2014/0317604 A1* | 10/2014 | Gataullin | ............ | G06F 11/3676 717/128 |
| 2014/0317605 A1 | 10/2014 | Gataullin et al. | | |
| 2014/0365833 A1* | 12/2014 | Bourne | ............... | G06F 11/3636 714/45 |
| 2015/0006961 A1 | 1/2015 | Bourne et al. | | |

OTHER PUBLICATIONS

IBM, "List of IBM Patents or Patent Applications Treated as Related (Appendix P)," Apr. 29, 2016, p. 1-2.

Doi et al., "Dynamic Trace Level Control," Application and Drawings, filed Apr. 29, 2016, 39 Pages, U.S. Appl. No. 15/141,914.

* cited by examiner

DYNAMIC TRACE LEVEL CONTROL

BACKGROUND

The present invention relates generally to the field of computing, and more particularly to trace logging.

Program execution information may be recorded to assist in diagnosing and debugging program issues using various techniques, such as event logging and trace logging. Event logging relates to recording program information relating to diagnostic and auditing purposes for system administrators. Similarly, trace logging (i.e. trace information logging, software tracing, or tracing) relates to recording information about a software program's execution primarily used by a programmer to debug a computer program.

SUMMARY

According to one embodiment, a method for adjusting a filtering mechanism within a trace logging system. The method may include receiving a plurality of messages from a software program, whereby each of the plurality of messages includes a message logging level. The method may also include storing the plurality of received messages in a buffer. The method may further include determining an error has occurred within the software program. The method may also include identifying each of the plurality of stored messages that aid in debugging the determined error. The method may further include updating an alert status configuration based on the message logging level associated with each of the plurality of identified messages.

According to another embodiment, a computer system for adjusting a filtering mechanism within a trace logging system. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving a plurality of messages from a software program, whereby each of the plurality of messages includes a message logging level. The computer system may also include storing the plurality of received messages in a buffer. The computer system may further include determining an error has occurred within the software program. The computer system may also include identifying each of the plurality of stored messages that aid in debugging the determined error. The computer system may further include updating an alert status configuration based on the message logging level associated with each of the plurality of identified messages.

According to yet another embodiment, a computer program product for adjusting a filtering mechanism within a trace logging system. The computer program product may include one or more computer-readable storage devices and program instructions stored on at least one of the one or more tangible storage devices, the program instructions executable by a processor. The computer program product may include program instructions to receive a plurality of messages from a software program, whereby each of the plurality of messages includes a message logging level. The computer program product may also include program instructions to store the plurality of received messages in a buffer. The computer program product may further include program instructions to determine an error has occurred within the software program. The computer program product may also include program instructions to identify each of the plurality of stored messages that aid in debugging the determined error. The computer program product may further include program instructions to update an alert status configuration based on the message logging level associated with each of the plurality of identified messages.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to trace logging. The following described exemplary embodiments provide a system, method, and program product to, among other things, dynamically adjust the filtering mechanism within a trace logging framework upon the occurrence of an error. Therefore, the present embodiment has the capacity to improve the technical field of trace logging by automatically adjusting the trace level based on the process flow thereby allowing the logging of more useful information for aiding in problem analysis. More specifically, the present embodiment may allow for more efficient resolution of program errors by automatically adjusting the scope of a filter mechanism in a track logging system so necessary information may be captured earlier in the debugging process.

As previously described, trace logging (i.e. trace information logging, software tracing, or tracing) relates to recording information about a software program's execution. Frequently used by programmers, trace logging may aid in the gathering of information for debugging and problem analysis. The information gathered may be stored in a logfile. A logfile is a data file that may store information pertaining to events that occur within a software program. For example, when a program developer discovers an error that causes a program to crash, the developer may review the logfile to determine under what circumstances the error occurred and, thereby, fix the error.

Typical trace logging involves gathering information related to a program error and the circumstances under which the error occurred. When a program encounters complex errors, determining a solution may be difficult with only the typically logged information. Some errors may be more easily debugged if information relating to normal operations prior to the error's occurrence is provided within the logfile. For example, providing the program execution path prior to the error's occurrence and the parameters passed to the program routine may be useful to a developer debugging a program error.

Furthermore, trace logging inherently has two conflicting demands of gathering as much detailed information as possible to allow a developer to make an efficient problem determination when an error occurs and limiting the burden on system resources during normal operations in expectation of a program error that may not occur. In the case of gathering every item of information necessary to debug a program error, always logging detailed information, such as the program environment before and after the error, may consume enough central processing unit (CPU) and storage resources to affect system performance. With respect to logging information in order to conserve system resources, logging too little information, such as logging only the error message, may not provide enough detail to allow a developer to understand a detailed status of the problematic environment in which the error occurred or to determine the actual cause of a program error.

Therefore, many trace logging methods provide mechanisms that allow system administrators to configure the detail level of logging for each module or function. When an error occurs and not enough detailed information is recorded within the log, the system administrator may change the configuration of the tracing system so that more information is captured upon the subsequent occurrence of the program error.

Unfortunately, changing the trace logging configuration after a program error occurs requires reproduction of the error in order for the configuration change to gather the detailed information necessary to allow the system administrator to debug. Additionally, based on the category or type of some program errors, a system administrator may not be aware of the logging level to which the trace logging configuration needs to be adjusted in order to capture the needed information. For example, if the execution of a sequence of modules causes an error in one of the modules, the system administrator may raise the logging level of the module in which the error occurred. However, determining whether and to what degree to raise the logging level in the other modules may be difficult for the system administrator given the type of program error. Such a problem may result in repeated problem reproductions and configuration updates by the system administrator until a correct logging level is reached that gathers the appropriate amount of information needed to debug the error. Therefore, the turnaround time between the user and support/development team to solve the program error is unnecessarily increased. Furthermore, the debugging time when repeated configuration changes are needed may be exacerbated when the program error only occurs intermittently and the procedure to reproduce the error is unknown. As such, it may be advantageous, among other things, to implement a system that logs message information in a buffer and automatically adjusts the filtering mechanism used to record information into a trace log when an error occurs based on the message information within the buffer.

According to one embodiment, a programmer may insert trace application programming interface (API) calls into a program to log messages helpful during problem analysis. The programmer may also insert an API call to transmit an alert to the trace API of an error condition. An error handler or an exception handler may be implemented to review received messages for error conditions. Furthermore, an administrator may set a trace level for various scopes of configuration information. Additionally, a buffer may be used by a trace logging system to store message information to aid in the debugging process. Therefore, once an error occurs, the buffer may be examined to determine the sequence of related parts of the program that led to the error. The trace logging system may then automatically increase the logging level of the related parts. By increasing the logging level for the parts of the program that led to the occurrence of the error, the probability of the trace logging system obtaining useful detailed trace information upon the next occurrence of the error is increased. By obtaining useful detailed trace information through automatically raising the logging level of the program areas related to the error, any user or programmer resources allocated to debugging the error may be reduced since the error may be corrected after only two occurrences.

Such an implementation may improve problem analysis for the IBM® Rational Developer for System z (RDz) (IBM RDz and all IBM RDz-based trademarks and logos are trademarks or registered trademarks of International Business Machines Corporation and/or its affiliates). A customer may not desire to increase CPU and storage resource consumption, especially for a production environment of mission critical mainframe systems. Furthermore, such systems may not allow frequent configuration changes. Once program errors occur, an IBM® RDz support team may have difficulty directing customers to change the system configurations in order to reproduce the error. Therefore, achieving a trace log with information necessary to correct the problem with a short turnaround time may be troublesome.

Typically, program errors that repeatedly occur may be classified as higher severity and require more immediate attention to solve. Therefore, preventing repeated occurrences of program errors may be desirable. The present embodiment may prevent the need to reproduce the error to collect the trace information needed to debug the error by increasing the possibility that useful information is collected in a short period of time with a minimal increase in resource consumption.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to dynamically adjust the filtering mechanism within a trace logging framework upon the occurrence of an error. The trace logging framework may implement a buffer to store all received message information. Once an error occurs, the buffer may be examined to determine the sequence of events that may have led to the error.

Figure 1:
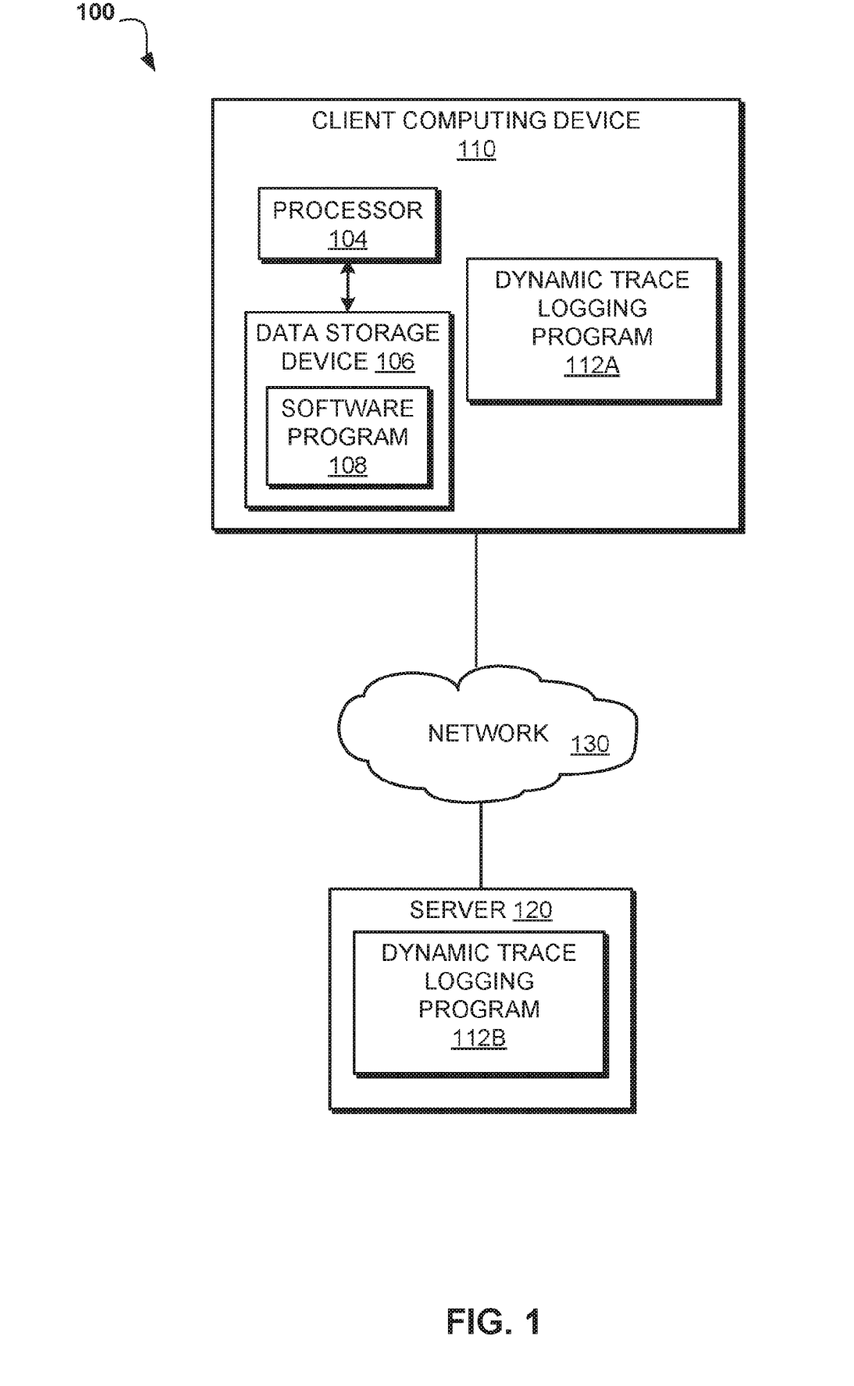
FIG. 1 is an exemplary networked computer environment, in accordance with one embodiment of the present invention.

Referring to FIG. 1, an exemplary networked computer environment 100 is depicted, in accordance with one embodiment. The networked computer environment 100 may include a client computing device 110 and a server 120 interconnected via a communication network 130. According to at least one implementation, the networked computer environment 100 may include a plurality of client computing devices 110 and servers 120, only one of each being shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host a software program 108, a Dynamic Trace Logging Program 112A, and communicate with the server 120 via the communication network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 110 may include internal components 602a and external components 604a, respectively.

The server computer 120 may be a laptop computer, netbook computer, personal computer (PC), a desktop computer, or any programmable electronic device capable of hosting a Dynamic Trace Logging Program 112B and communicating with the client computing device 110 via the communication network 130, in accordance with embodiments of the invention. As will be discussed with reference to FIG. 6, the server computer 120 may include internal components 602b and external components 604b, respectively. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the Dynamic Trace Logging Program 112A, 112B may be a program capable of receiving data from the software program 108, logging the data in a buffer, reviewing the logged data when an error occurs within the software program 108, and adjusting a filtering mechanism so the necessary received data to debug the error is recorded within a trace log. The Dynamic Trace Logging Program 112A, 112B is explained in further detail below with respect to FIG. 2 and FIG. 3.

Figure 2:
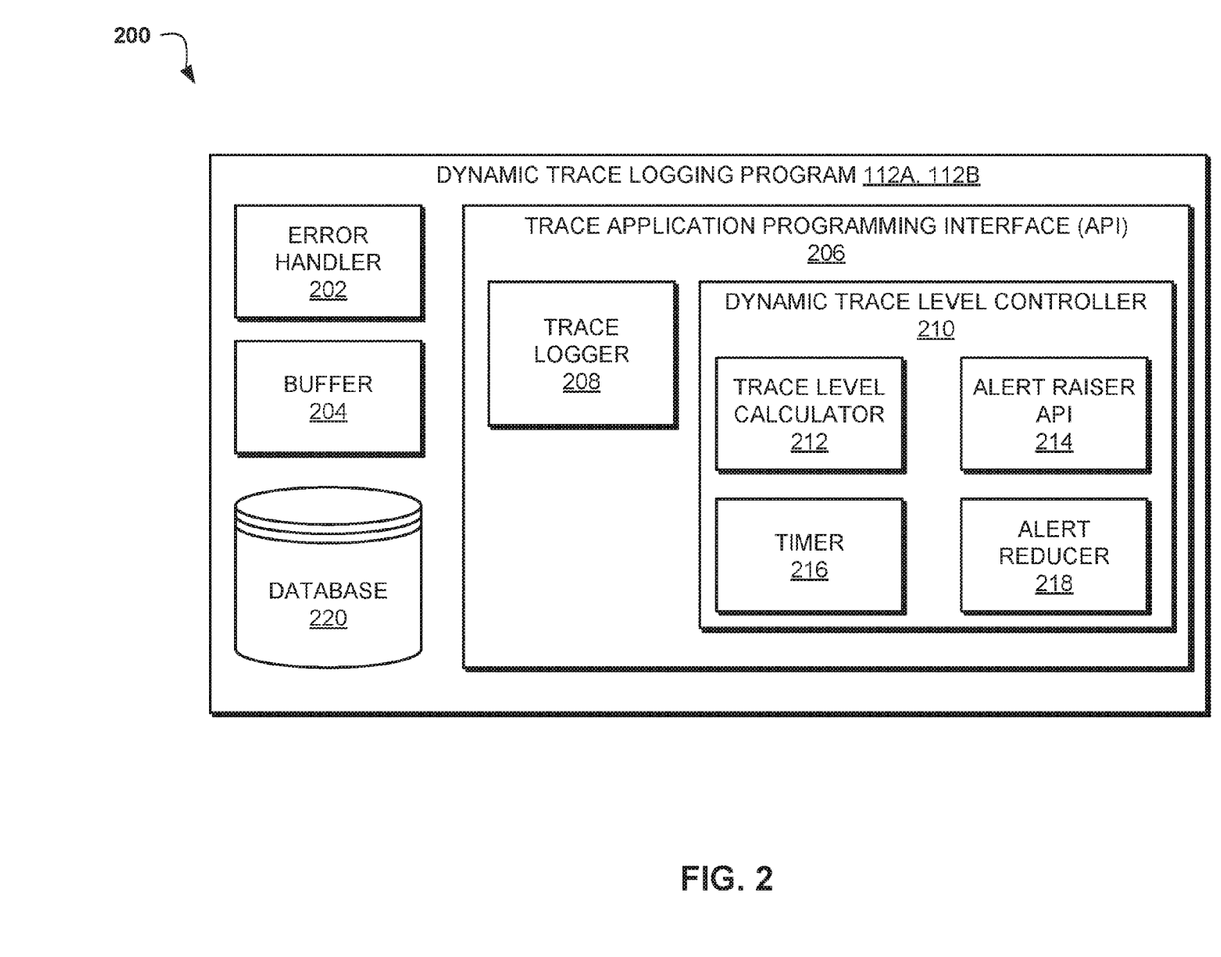
FIG. 2 is a dynamic trace logging program functional block diagram, in accordance with one embodiment of the present invention.

Referring now to FIG. 2, a dynamic trace logging program functional block diagram 200 is depicted, in accordance with one embodiment of the present invention. The Dynamic Trace Logging Program 112A, 112B (FIG. 1) may include an error handler 202, a buffer 204, a trace application programming interface (API) 206, and a database 220.

The error handler 202 may be a program capable of analyzing received message data to determine if an error has occurred within the software program 108 (FIG. 1). When the error handler 202 determines an error has occurred in the software program 108 (FIG. 1), the error handler 202 may transmit a signal informing the trace API 206 that the error has occurred.

The buffer 204 may be a repository for temporarily storing message information, such as message scope, timestamp, message text, program status, and message logging level, in a first-in-first-out basis. The buffer 204 may receive the message information from the trace API 206. When an error occurs, the buffer 204 may be analyzed for the sequence of message information stored prior to the error's occurrence.

The database 220 may be a repository for storing various log information, such as a trace configuration level, a trace log, and an alert status for the system. The trace configuration level (i.e. trace configuration) may be configurable by a system administrator based on various scopes, such as a module or unit of function. Additionally, the trace configuration may indicate the level at which messages should be recorded within the trace log. The trace log may be a repository, such as the database 220, which stores the received data message information satisfying the preconfigured trace configuration. The alert status may include information necessary for the Dynamic Trace Logging Program 112A, 112B (FIG. 1) to calculate the actual logging level based on the configured trace level. The actual logging level may be calculated as a sum of the trace configuration and the alert status. For example, if the trace configuration is set by a system administrator to record all received messages with a level two message logging level and the alert status is set at +1, then the actual logging level may be calculated as level three and, therefore, all received messages with a level three message logging level may be recorded to the trace log.

The trace API 206 may be a program capable of logging messages to assist in problem analysis. The trace API 206 may host a trace logger 208 and a dynamic trace level controller 210. The trace logger 208 may a program capable of storing messages within the buffer 204 and filtering received messages for storage within the trace log in the database 220. The dynamic trace level controller 210 may be a program capable of managing the system alert status. The dynamic trace level controller 210 may change the alert status of the system based on various configurable criteria, such as elapsed time since an error was last received and information within the buffer 204 needed for a system administrator to debug an error. The dynamic trace level controller 210 may include a trace level calculator 212, an alert raiser API 214, a timer 216, and an alert reducer 218. The trace level calculator 212 may calculate an appropriate actual logging level for a received message by calculating the sum of the trace configuration and the alert status. The alert raiser API 214 may be a program capable of raising the system alert status. The timer 216 may be a program capable establishing an effective time to monitor for a program error at an elevated alert status and monitoring the amount of time that has elapsed since the last occurred error within the software program 108 (FIG. 1). The alert reducer 218 may be a program capable of reducing the alert status of the system upon the expiration of the effective time as monitored by the timer 216.

Figure 3:
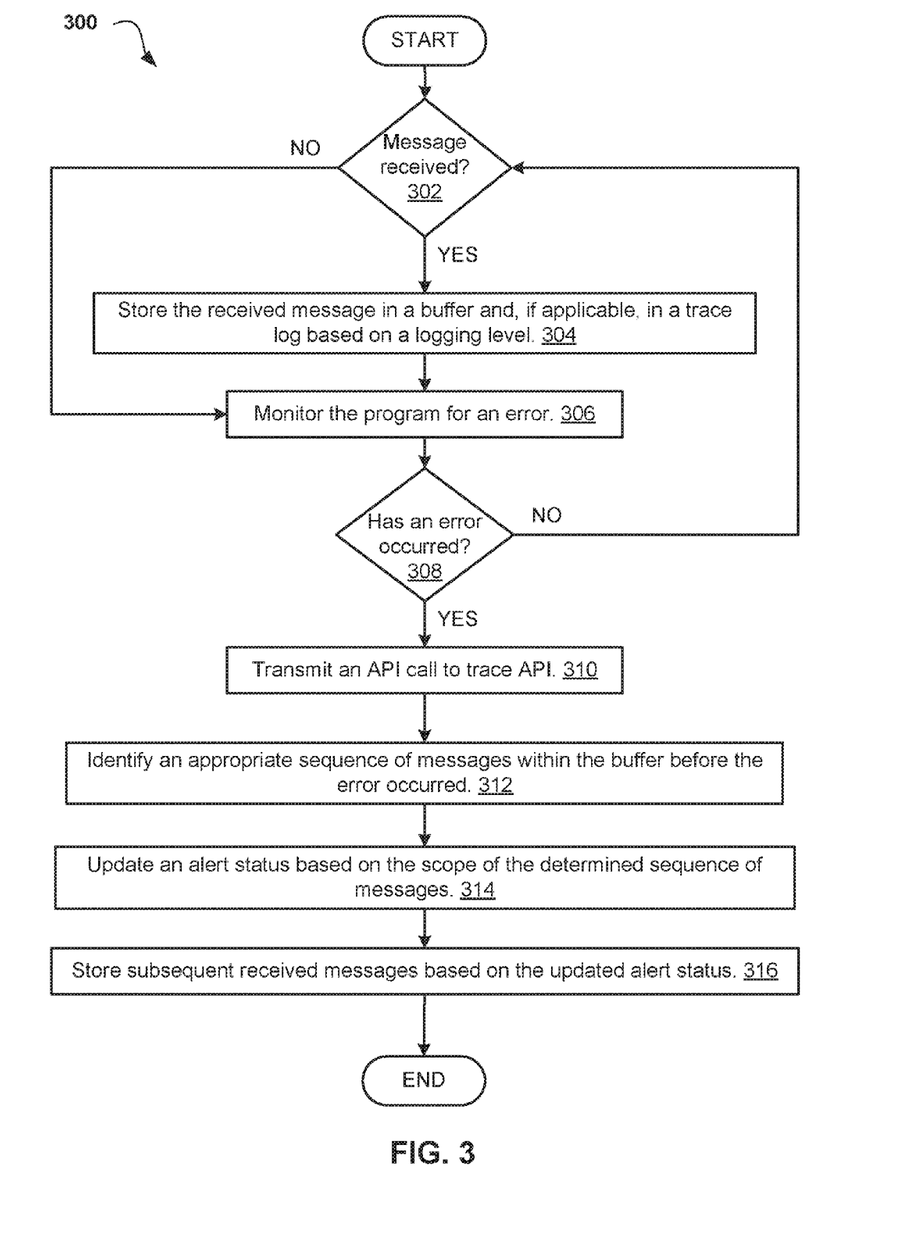
FIG. 3 illustrates a flowchart of the operational steps carried out by a program to dynamically adjust the filtering mechanism of a trace logging system, in accordance with one embodiment of the present invention.

Referring now to FIG. 3, a flowchart 300 of the operational steps carried out by a program to dynamically adjust the filtering mechanism of a trace logging system is depicted, in accordance with one embodiment of the present invention. At 302, the Dynamic Trace Logging Program 112A, 112B (FIG. 1) determines whether a message has been received from the software program 108 (FIG. 1). During execution of the software program 108 (FIG. 1), various messages may be transmitted by the software program 108 (FIG. 1) to the Dynamic Trace Logging Program 112A, 112B (FIG. 1). Each message may relay information relevant to the performance or status of the software program 108 (FIG. 1). Each received message may contain a message scope, a timestamp, message text, a program status, and a message logging level. For example, a message received by the Dynamic Trace Logging Program 112A, 112B (FIG. 1) may include information relating to a user's interactions with a graphical user interface. Similarly, a received message may relay an error condition experienced by the software program 108 (FIG. 1). According to one implementation, the method may continue along the operational flowchart 300, if a message is received from the software program 108 (FIG. 1). If the Dynamic Trace Logging Program 112A, 112B (FIG. 1) receives a message (step 302, "YES" branch), the Dynamic Trace Logging Program 112A, 112B (FIG. 1) may continue to step 304 to store the received message within the buffer 204 (FIG. 2) and, based on the message logging level of the received message, within a trace log within database 220 (FIG. 2). If the Dynamic Trace Logging Program 112A, 112B (FIG. 1) determines has not been received (step 302, "NO" branch), the Dynamic Trace Logging Program 112A, 112B (FIG. 1) may advance to step 306 to monitor the software program 108 (FIG. 1) for an error condition. The error handler 202 (FIG. 2) may be capable of determining whether an error has occurred within the software program 108 (FIG. 1).

Next at 304, the Dynamic Trace Logging Program 112A, 112B (FIG. 1) stores each received message in a buffer 204 (FIG. 2) and, based on the message logging level of each received message, in a trace log within the database 220 (FIG. 2). The Dynamic Trace Logging Program 112A, 112B (FIG. 1) may utilize the buffer 204 (FIG. 2), which may be a first-in-first-out buffer, to temporarily store each received message. The Dynamic Trace Logging Program 112A, 112B (FIG. 1), utilizing a filtering mechanism, such as the trace logger 208 (FIG. 2), may also store received messages in a trace log within the database 220 (FIG. 2) according to the message logging level associated with each message. The message logging level may be a variable indicating the message severity of a received message and used by the trace logger 208 (FIG. 2) to determine whether to store the received message within the trace log. The Dynamic Trace Logging Program 112A, 112B (FIG. 1) may compare the message logging level of each received message with on a trace configuration within the database 220 (FIG. 2) preconfigured by a system administrator. For example, if a system administrator preconfigures the trace configuration within the database 220 (FIG. 2) to level two, then each received message with a level two message logging level may be stored within the trace log and the buffer 204 (FIG. 2). Similarly, received messages with a lower logging level, such as level three, may only be stored in the buffer 204 (FIG. 2) and not within the trace log in database 220 (FIG. 2) when the trace configuration is set to level two. Furthermore, the trace logging level may be updated by a system administrator through a settings menu on a graphical user interface or by the Dynamic Trace Logging Program 112A, 112B (FIG. 1) upon the occurrence of an error within the software program 108 (FIG. 1) that requires a change of the trace configuration in order to record more received messages in the trace log to assist in problem analysis.

Then at 306, the Dynamic Trace Logging Program 112A, 112B (FIG. 1) monitors the software program 108 (FIG. 1) for an error. The Dynamic Trace Logging Program 112A, 112B (FIG. 1) may continually record all received messages to the buffer 204 (FIG. 2) and received messages at or higher than the trace configuration to the trace log. The Dynamic Trace Logging Program 112A, 112B (FIG. 1), utilizing the error handler 202 (FIG. 2), may determine when an error has occurred within the software program 108 (FIG. 1). Furthermore, a message recorded to the buffer 204 (FIG. 2) may be flushed from the buffer 204 (FIG. 2) after a preconfigured period of time in order to free up buffer storage space for subsequent received messages.

Next at 308, the Dynamic Trace Logging Program 112A, 112B (FIG. 1) determines whether an error has occurred. According to one implementation, the method may continue along the operational flowchart 300, if an error has occurred within the software program 108 (FIG. 1). If the Dynamic Trace Logging Program 112A, 112B (FIG. 1) determines an error has occurred (step 308, "YES" branch), the Dynamic Trace Logging Program 112A, 112B (FIG. 1) may continue to step 310 to transmit an API call to the alert raiser API 214 (FIG. 2) within the trace API 206 (FIG. 2) notifying the alert raiser API 214 (FIG. 2) of the error within the software program 108 (FIG. 1). If the Dynamic Trace Logging Program 112A, 112B (FIG. 1) determines an error has not occurred (step 308, "NO" branch), the Dynamic Trace Logging Program 112A, 112B (FIG. 1) may return to step 302 to receive a message from the software program 108 (FIG. 1). The error handler 202 (FIG. 2) may be capable of determining an error has occurred within the software program 108 (FIG. 1) based on the information within the received message.

Then at 310, the Dynamic Trace Logging Program 112A, 112B (FIG. 1) may transmit an API call from the error handler 202 (FIG. 2) to the alert raiser API 214 (FIG. 2). When the Dynamic Trace Logging Program 112A, 112B (FIG. 1), through the error handler 202 (FIG. 2), determines an error has occurred based on the information within a received message, the error handler 202 (FIG. 2) may notify the alert raiser API 214 (FIG. 2) by transmitting an API call from the error handler 202 (FIG. 2) to the alert raiser API 214 (FIG. 2).

Then at 312, the Dynamic Trace Logging Program 112A, 112B (FIG. 1) identifies an appropriate sequence of messages stored within buffer 204 (FIG. 2) prior to the error occurring. When an alert API call is received by the alert raiser API 214 (FIG. 2) within the trace API 206 (FIG. 2), the alert raiser API 214 (FIG. 2) may analyze the buffer 204 (FIG. 2) to identify a sequence of messages received prior to the error that may assist in debugging the error. For example, the Dynamic Trace Logging Program 112A, 112B (FIG. 1) may receive an error from the software program 108 (FIG. 1) and, upon analyzing the buffer 204 (FIG. 2), identify the five most recent messages stored within the buffer 204 (FIG. 2) as being helpful in debugging the error.

Next at 314, the Dynamic Trace Logging Program 112A, 112B (FIG. 1) updates the alert status within the database 220 (FIG. 2) based on the scope of the determined sequence of messages. Since the determined sequence of messages stored within the buffer 204 (FIG. 2) may not already be stored within the trace log in the database 220 (FIG. 2) and, therefore, the error may not be currently debugged, the Dynamic Trace Logging Program 112A, 112B (FIG. 1) may update the alert status within the database 220 (FIG. 2) so that subsequent received messages with a corresponding message logging level are recorded within the trace log. The Dynamic Trace Logging Program 112A, 112B (FIG. 1) may determine the appropriate alert status by using the trace level calculator 212 (FIG. 2) to analyze each of the determined messages within the buffer 204 (FIG. 2). Furthermore, the Dynamic Trace Logging Program 112A, 112B (FIG. 1) may use the alert raiser API 214 (FIG. 2) to raise the alert status of the trace logger 208 (FIG. 2) so the scope of the messages recorded by the trace logger 208 (FIG. 2) may be expanded. For example, in the previously described scenario, the Dynamic Trace Logging Program 112A, 112B (FIG. 1) may determine the five most recent messages stored within the buffer 204 (FIG. 2) may aid in debugging the error. However, not all of the determined messages may be stored within the trace log due to the current scope of the trace configuration. Three of the determined messages may have a level three message logging level and two of the determined messages may have a level two message logging level. If the preconfigured trace configuration is set at level three, then the Dynamic Trace Logging Program 112A, 112B (FIG. 1) may have only logged the three determined messages with a level three message logging level. Therefore, the Dynamic Trace Logging Program 112A, 112B (FIG. 1) may need to expand the scope of the trace logger 208 (FIG. 2) so that received messages with a level two message logging level are recorded in the trace log.

Additionally, the Dynamic Trace Logging Program 112A, 112B (FIG. 1) may determine that messages received from particular components within software program 108 (FIG. 1) should be recorded. Therefore, the Dynamic Trace Logging Program 112A, 112B (FIG. 1) may only expand the scope for the particular components within software program 108 (FIG. 1). For example, the Dynamic Trace Logging Program 112A, 112B (FIG. 1) may determine that component A and component B of the software program 108 (FIG. 1) should be recorded within an expanded scope but the current scope of recording for component C is adequate. As such, the Dynamic Trace Logging Program 112A, 112B (FIG. 1) may increase the alert status for component A and component B but keep the alert status of component C at the current configuration.

Then at 316, the Dynamic Trace Logging Program 112A, 112B (FIG. 1) stores subsequent received messages based on the updated alert status. Once the Dynamic Trace Logging Program 112A, 112B (FIG. 1) has updated the alert status, the Dynamic Trace Logging Program 112A, 112B (FIG. 1), utilizing the trace logger 208 (FIG. 2), may store subsequent received messages based on the logging level of those subsequent received messages and the updated alert status. Since not enough message information was present in the trace log to debug the error encountered by the software program 108 (FIG. 1) upon the first occurrence of the error, the Dynamic Trace Logging Program 112A, 112B (FIG. 1) may record subsequent messages within the trace log using an expanded scope. Therefore, upon the next occurrence of the same error, a user may be capable of debugging the error since the Dynamic Trace Logging Program 112A, 112B (FIG. 1) may have logged the necessary received messages within the trace log. For example, in the previously described example, if the Dynamic Trace Logging Program 112A, 112B (FIG. 1) determined the previous five messages received immediately prior to the error's occurrence aid in debugging an error, each of the five determined messages have a level two or level three message logging level, and the logging level scope of the trace logger 208 (FIG. 2) was expanded by increasing the alert status, then the Dynamic Trace Logging Program 112A, 112B (FIG. 1) may have logged all messages in the trace log that are necessary to debug the error upon the error's second occurrence. Once the Dynamic Trace Logging Program 112A, 112B (FIG. 1) has stored subsequent received messages based on the updated alert status, the operational flowchart 300 of the Dynamic Trace Logging Program 112A, 112B (FIG. 1) may terminate.

Figure 4:
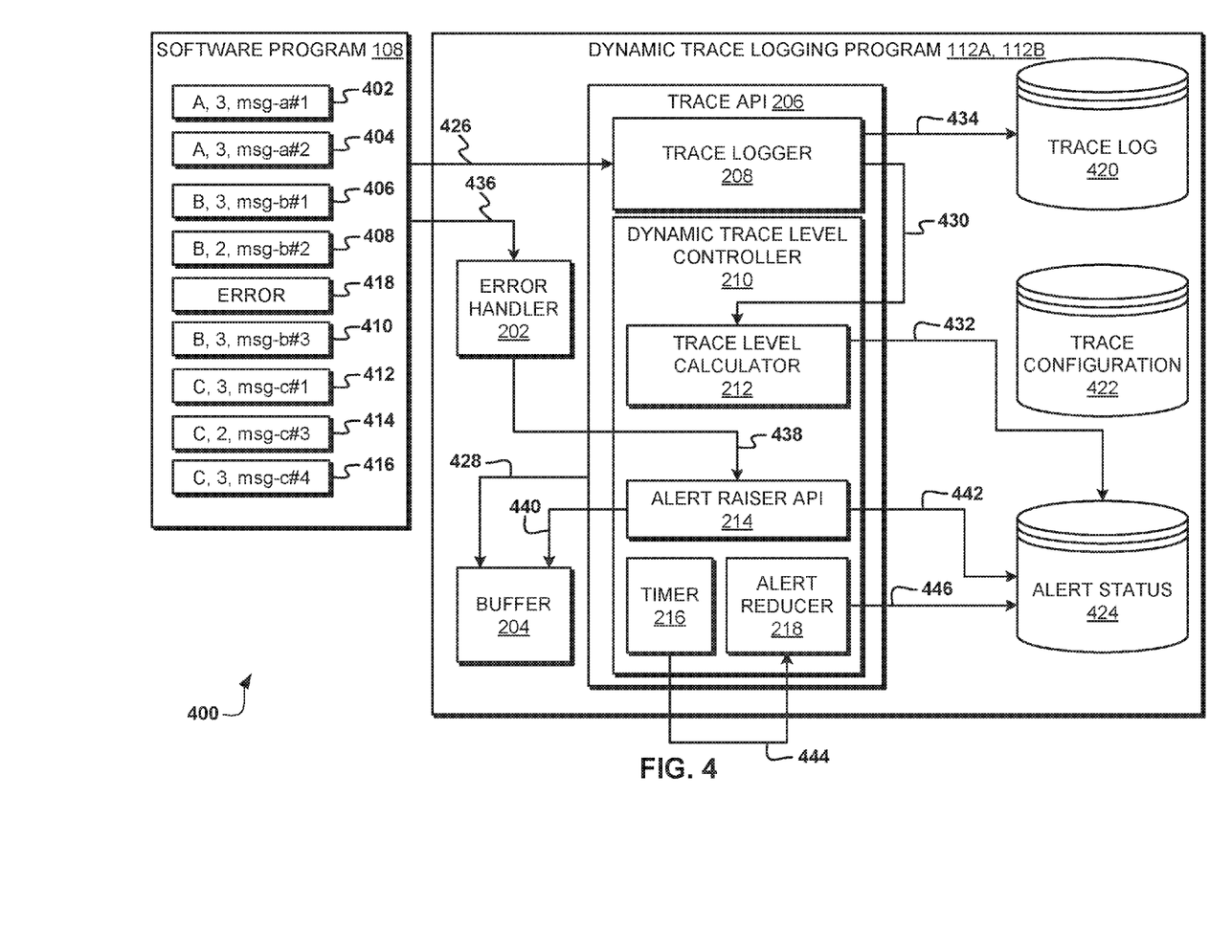
FIG. 4 is an operations functional block diagram of a dynamic trace logging program, in accordance with one embodiment of the present invention.

Referring now to FIG. 4, an operations functional block diagram 400 of a dynamic trace logging program is depicted, in accordance with one embodiment of the present invention. The Dynamic Trace Logging Program 112A, 112B may host a trace configuration repository 422 (i.e. trace configuration) preconfigured by a system administrator. The Dynamic Trace Logging Program 112A, 112B may use the trace configuration 422 to identify which received messages to record within a trace log 420 based on the message logging level associated with each received message 402-416. The trace configuration 422 may associate a higher severity to the messages 402-416 possessing a smaller message logging level. For example, the Dynamic Trace Logging Program 112A, 112B may determine the first message 402 received from the software program 108 has a low severity since the first message 402 has a level three message logging level number. Similarly, the Dynamic Trace Logging Program 112A, 112B may determine the fourth message 408 received from software program 108 has a medium severity since the fourth message 408 has a level two message logging level. Furthermore, the preconfigured trace configuration 422 may be set to different values for different components of the software program 108. For example, if the preconfigured trace configuration 422 is set to level one for component A, then the Dynamic Trace Logging Program 112A, 112B may not store either the first received message 402 or second received message 404 since each received message 402 and 404 have a message logging level below the preconfigured trace configuration 422. Similarly, if the preconfigured trace configuration 422 of component B in software program 108 is set to level two, then Dynamic Trace Logging Program 112A, 112B may store the fourth received message 408 since the preconfigured trace configuration 422 matches the message logging level of the fourth received message 408.

The software program 108, containing components A, B, and C, may produce the messages 402-416 during normal operations. At 426, the software program 108 may transmit the messages 402-416 to the trace logger 208 within the trace API 206 hosted in the Dynamic Trace Logging Program 112A, 112B. At 428, the trace API 206 may temporarily store the messages within the buffer 204. At 430, the trace logger 208 may utilize the trace level calculator 212 to determine whether to log each received message within the trace log 420 based on an actual trace logging level. At 432, the trace level calculator 212 may calculate an actual trace logging level for the system based on an alert status 424 and the trace configuration 422. The alert status 424 of the system may have an initial configuration of level zero. Subsequent to an error occurring in the software program 108, the alert status 424 may be raised so that the trace logger 208 may record a larger scope of received messages. For example, prior to an error occurring, the trace logger 208 may only be configured to record received messages in the trace log 420 with a level two message logging level for particular components of the software program 108, such as component A and component B. After an error has occurred within the software program 108, the Dynamic Trace Logging Program 112A, 112B may increase the alert status 424 to level one for component A and component B. Therefore, the trace level calculator 212 may add the value of the trace configuration 422 and the level of the alert status 424 to determine which messages to record to the trace log 420.

Therefore, if the alert status 424 is raised to level one due to an error in the software program 108 and the trace configuration 422 is set to level two so all messages with a level two message logging level are recorded, the trace level calculator 212 may identify all received messages with a level three message logging level should be recorded to the trace log 420 (i.e. level one+level two=level three). At 434, the trace logger 208 may record the received messages within the scope of the calculated actual trace logging level to the trace log 420.

When an error 418 occurs within the software program 108, the Dynamic Trace Logging Program 112A, 112B may determine that the alert status 424 should be raised. At 436, the error handler 202 within the Dynamic Trace Logging Program 112A, 112B may receive the error 418 from the software program 108. At 438, the error handler 202 may signal the alert raiser API 214 that an error has occurred. At 440, the alert raiser API 214, within the dynamic trace level controller 210, may analyze the buffer 204 for prior messages necessary to debug the error 418. For example, the alert raiser API 214 may determine each of the received messages 402-416 stored in the buffer 204 may be necessary to allow a user to debug the error 418. Therefore, at 442, the alert raiser API 214 may increase the alert status 424 to level+1, thereby, allowing the trace logger 208 to record each of the received messages 402-416 in the trace log 420, since the trace level calculator 212 will add +1 to the preconfigured trace configuration 422.

In one embodiment of the present invention, at 444, the Dynamic Trace Logging Program 112A, 112B, implementing the timer 216, may track the period of time since the error 418 last occurred. At 446, if the Dynamic Trace Logging Program 112A, 112B determines a preconfigured time period has elapsed, the alert reducer 218 may decrease the alert status 424. For example, if the alert status 424 was previously raised to +1 and the preconfigured period of time within the timer 216 is set to two hours, the alert reducer 218 may decrease the alert status 424 after two hours have elapsed without the error 418 occurring in the software program 108.

Figure 5:
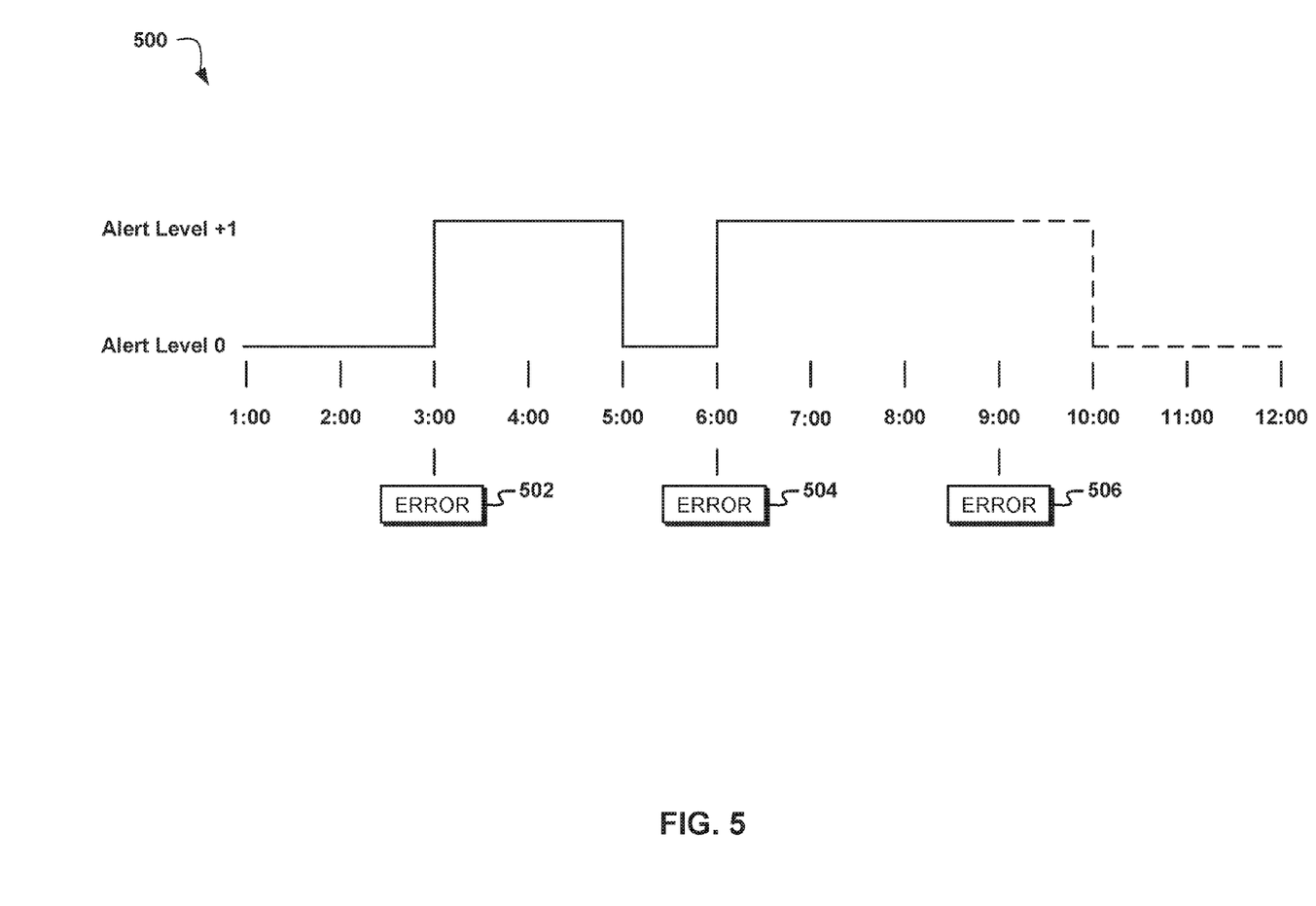
FIG. 5 is an effective time period adjustment functional block diagram of an alert status for a dynamic trace logging program, in accordance with one embodiment of the present invention.

Referring now to FIG. 5, an effective time period adjustment functional block 500 diagram of an alert status for a dynamic trace logging program is depicted, in accordance with one embodiment of the present invention. When a first error 502 occurs, the Dynamic Trace Logging Program 112A, 112B (FIG. 1) may raise the alert status 424 (FIG. 4) so a larger scope of the received messages 402-416 (FIG. 4) are recorded by the trace logger 208 (FIG. 2). For example, when the first error 502 occurs at 3:00, the Dynamic Trace Logging Program 112A, 112B (FIG. 1) may raise the alert status 424 (FIG. 4) from level 0 to level+1. Furthermore, timer 216 (FIG. 2) may begin counting for a preconfigured effective time period, such as two hours, once the alert status 424 (FIG. 4) is raised. When the preconfigured time period on timer 216 (FIG. 2) has elapsed and a subsequent error has not occurred, the alert reducer 218 (FIG. 2) may lower the alert level to an original level. For example, when the first error 502 occurs at 3:00 and the preconfigured effective time on the timer 216 (FIG. 2) is set to two hours, the alert reducer 218 (FIG. 2) may lower the alert status 424 (FIG. 4) from level+1 to level 0 at 5:00, if no errors have occurred since the first error 502.

Thereafter, a subsequent error 504, which may be identical to the first error 502, occurs after the alert reducer 218 (FIG. 2) has lowered the alert status 424 (FIG. 4), the Dynamic Trace Logging Program 112A, 112B (FIG. 1) may again raise the alert status 424 (FIG. 4). However, the Dynamic Trace Logging Program 112A, 112B (FIG. 1) may determine to adjust the preconfigured time period on the timer 216 (FIG. 2) so that the appropriate received messages 402-416 (FIG. 4) to debug the first error 502 and the subsequent error 504 are recorded within the trace log 420 (FIG. 4). By adjusting the preconfigured time period on the timer 216 (FIG. 2), when a second subsequent error 506 identical to the first error 502 and the subsequent error 504 occurs while the alert status 424 (FIG. 4) is raised, the appropriate received messages 402-416 (FIG. 4) needed to debug each error 502-506 may be recorded in the trace log 420 (FIG. 4). The Dynamic Trace Logging Program 112A, 112B (FIG. 1) may adjust the preconfigured time period of the timer 216 (FIG. 2) by calculating the total elapsed time between the occurrence of the first error 502 and the subsequent error 504. The Dynamic Trace Logging Program 112A, 112B (FIG. 1) may then set the preconfigured time period of the timer 216 (FIG. 2) to a time period greater than the calculated time difference. For example, if the first error 502 occurred at 3:00 and the alert status 424 (FIG. 4) was raised by the alert raiser API 214 (FIG. 2) from level 0 to level+1, then the timer 216 (FIG. 2) may count down through a preconfigured time period, such as 2 hours. At 5:00, after the expiration of the two hour time period, the alert reducer 218 (FIG. 2) may lower the alert status 424 (FIG. 4) from level+1 to level 0. At 6:00, the subsequent error 504 may occur and the alert raiser API 214 (FIG. 2) may again increase the alert status 424 (FIG. 4) from level 0 to level+1. Since an insufficient number of the received messages 402-416 (FIG. 4) may have been recorded within the trace log 420 (FIG. 4), the Dynamic Trace Logging Program 112A, 112B (FIG. 1) may increase the effective time period of the timer 216 (FIG. 2) to four hours since the time difference between the first error 502 and the subsequent error 504 is three hours. Therefore, at 9:00, when the second subsequent error 506 identical to the first error 502 and the subsequent error 504 occurs, the Dynamic Trace Logging Program 112A, 112B (FIG. 1) may have recorded the appropriate received messages 402-416 (FIG. 4) necessary to debug each error 502-506 since the alert status 424 (FIG. 4) was set to level +1 when the second subsequent error 506 occurred.

Figure 6:
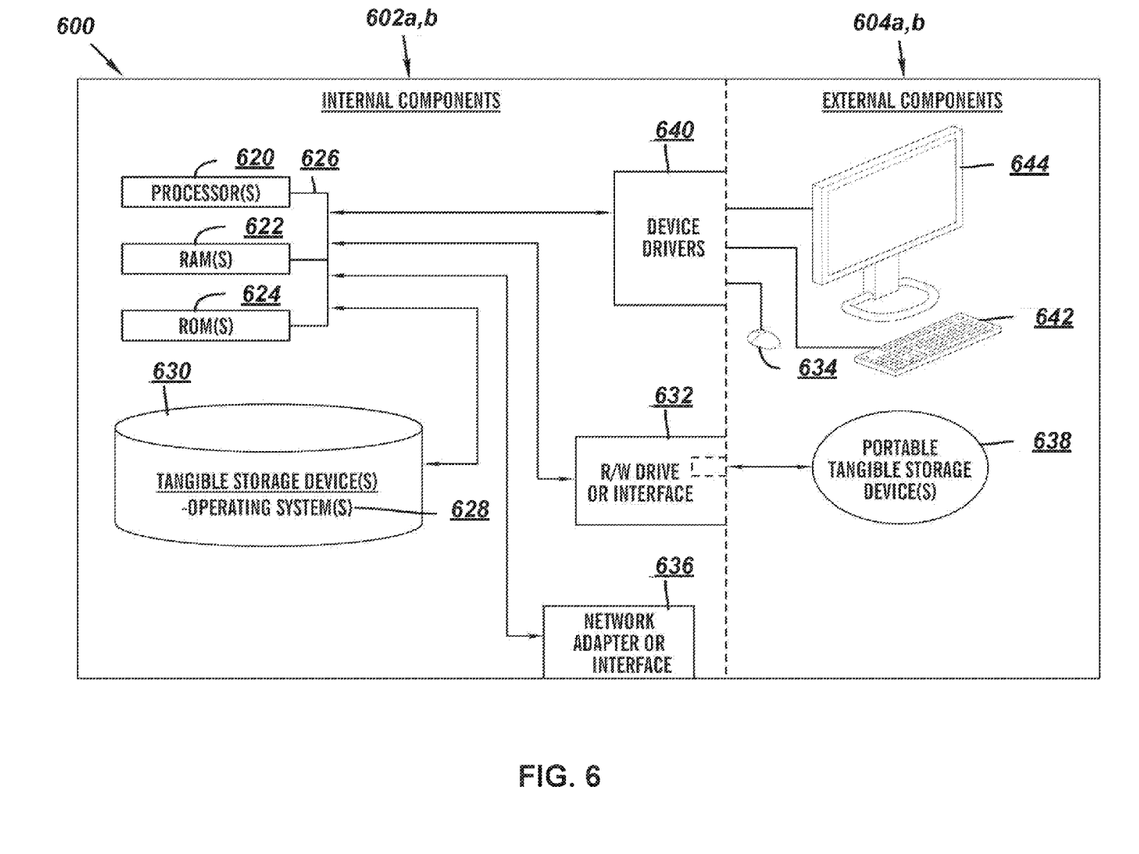
FIG. 6 is a block diagram of internal and external components of computers and servers depicted in FIG. 1 according to at least one embodiment.

FIG. 6 is a block diagram 600 of internal and external components of the client computing device 110 and the server 120 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 110 (FIG. 1) and the server 120 (FIG. 1) may include respective sets of internal components 602 *a,b* and external components 604 *a,b* illustrated in FIG. 6. Each of the sets of internal components 602 include one or more processors 620, one or more computer-readable RAMs 622 and one or more computer-readable ROMs 624 on one or more buses 626, and one or more operating systems 628 and one or more computer-readable tangible storage devices 630. The one or more operating systems 628, the Dynamic Trace Logging Program 112A (FIG. 1) in the client computing device 110 (FIG. 1), and the Dynamic Trace Logging Program 112B (FIG. 1) in the server 120 (FIG. 1) are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 *a,b* also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the Dynamic Trace Logging Program 112A, 112B (FIG. 1), can be stored on one or more of the respective portable computer-readable tangible storage devices 638, read via the respective R/W drive or interface 632 and loaded into the respective hard drive 630.

Each set of internal components 602 *a,b* also includes network adapters or interfaces 636 such as a TCP/IP adapter cards, wireless Wi-Fi interface cards, or 3G or 4G wireless interface cards or other wired or wireless communication links. The Dynamic Trace Logging Program 112A (FIG. 1) in the client computing device 110 (FIG. 1) and the Dynamic Trace Logging Program 112B (FIG. 1) in the server 120 (FIG. 1) can be downloaded to the client computing device 110 (FIG. 1) and the server 120 (FIG. 1) from an external computer via a network (for example, the Internet, a local area network or other, wide area network) and respective network adapters or interfaces 636. From the network adapters or interfaces 636, the Dynamic Trace Logging Program 112A (FIG. 1) in the client computing device 110 (FIG. 1) and the Dynamic Trace Logging Program 112B (FIG. 1) in the server 120 (FIG. 1) are loaded into the respective hard drive 630. The network may comprise copper wires, optical fibers, wireless transmission, routers, firewalls, switches, gateway computers and/or edge servers.

Each of the sets of external components 604 *a,b* can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642, and computer mouse 634. The device drivers 640, R/W drive or interface 632 and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
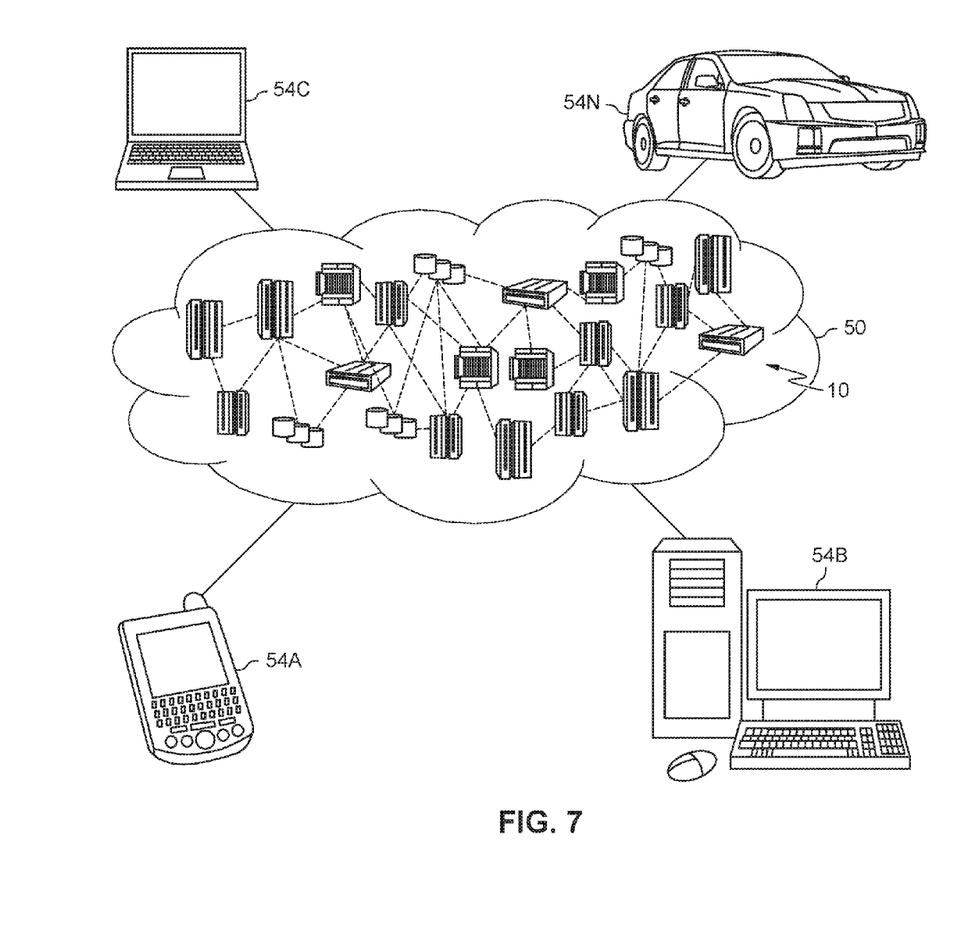
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
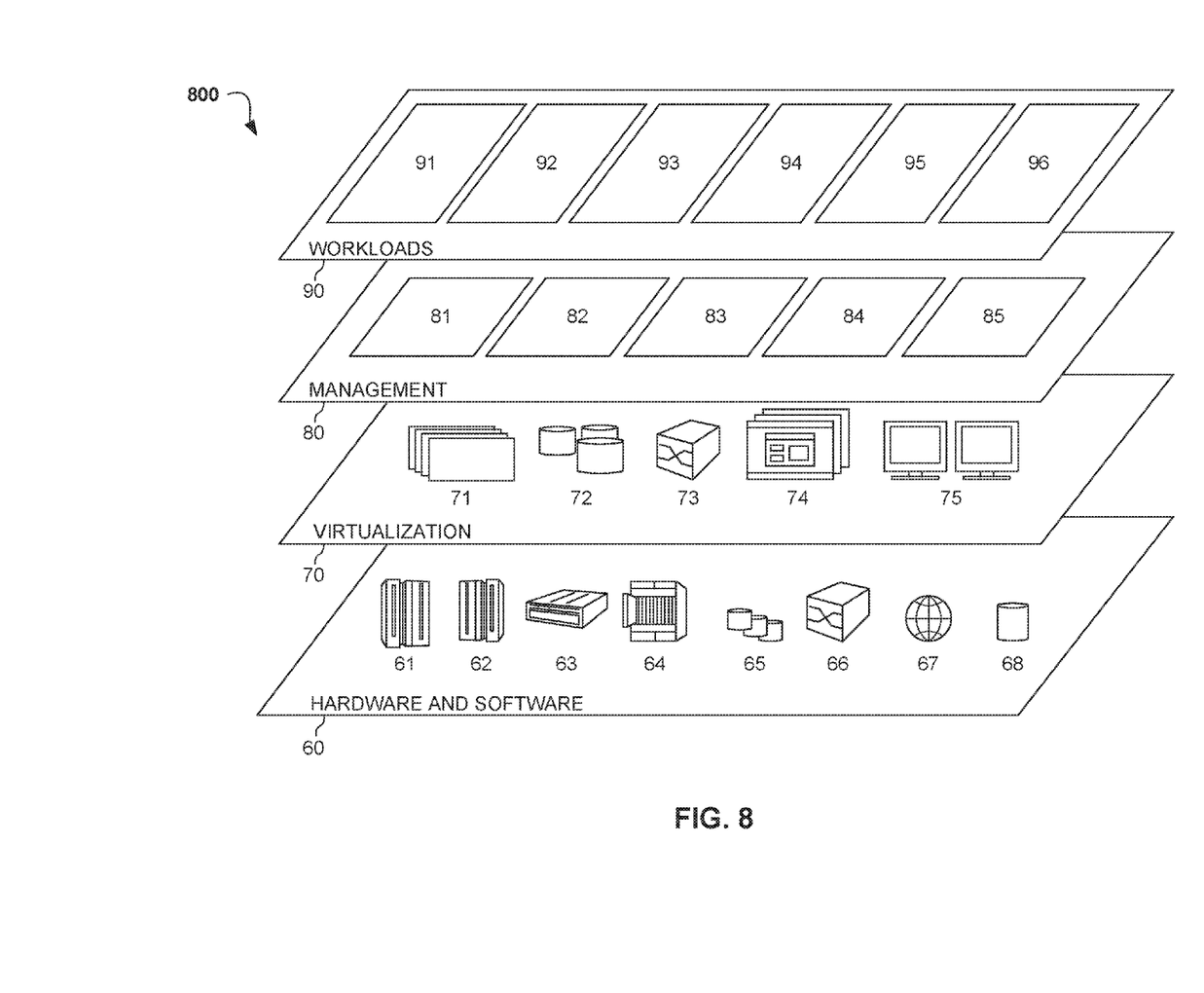
FIG. 8 depicts abstraction model layers according to an embodiment of the present invention.

Referring now to FIG. 8 a set of functional abstraction layers 800 provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic trace logging 96. Dynamic trace logging 96 may refer to adjusting the scope of a filtering mechanism within a trace logging system whenever a program error occurs. Furthermore, the appropriate scope to which the filtering mechanism should be set to may be based on message data stored within a buffer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for adjusting a filtering mechanism within a trace logging system, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
receiving a plurality of messages from a software program, wherein each of the plurality of messages includes a message logging level;
storing the plurality of received messages in a buffer;
storing a set of the plurality of received messages in a trace log within a database based on the message logging level associated with each of the plurality of received messages;

determining that an error has occurred within the software program;

identifying a plurality of the stored messages in the buffer that aid in debugging the determined error;

comparing the plurality of identified messages in the buffer that aid in debugging the determined error with the stored set of the plurality of received messages in the trace log;

determining that less than all of the plurality of identified messages in the buffer are stored within the trace log based on the comparing the plurality of identified messages in the buffer with the stored set of the plurality of received messages in the trace log;

updating an alert status configuration based on the message logging level associated with each of the plurality of identified messages in the buffer;

receiving a plurality of subsequent messages from the software program, wherein each of the plurality of subsequent messages includes a message logging level; and recording a set of the plurality of received subsequent messages in the trace log by comparing a sum of the updated alert status configuration and a trace configuration level to the message logging level of each of the plurality of received subsequent messages.

2. The computer system of claim 1, further comprising:
recording a second set of the plurality of received messages in the trace log based on the updated alert status configuration, a trace configuration level, and the message logging level of each of the plurality of received messages.

3. The computer system of claim 1, wherein the received plurality of messages includes at least one of a message scope, a timestamp, a plurality of message text, and a program status associated with the software program.

4. The computer system of claim 1, wherein the buffer is a first-in-first-out buffer that temporarily stores each of the plurality of received messages.

5. The computer system of claim 1, wherein updating the alert status configuration further comprises:
increasing the alert status configuration for a preconfigured time period; and
reducing the alert status configuration upon an expiration of the preconfigured time period using an alert reducer.

6. A computer program product for adjusting a filtering mechanism within a trace logging system, the computer program product comprising:
one or more computer-readable tangible storage media and program instructions stored on at least one of the one or more tangible storage media, the program instructions executable by a processor, the program instructions comprising:
program instructions to receive a plurality of messages from a software program, wherein each of the plurality of messages includes a message logging level;
program instructions to store the plurality of received messages in a buffer;
program instructions to store a set of the plurality of received messages in a trace log within a database based on the message logging level associated with each of the plurality of received messages;
program instructions to determine an error has occurred within the software program;
program instructions to identify a plurality of the stored messages in the buffer that aid in debugging the determined error;
program instructions to compare the plurality of identified messages in the buffer that aid in debugging the determined error with the stored set of the plurality of received messages in the trace log;
program instructions to determine that less than all of the plurality of identified messages in the buffer are stored within the trace log based on the comparing the plurality of identified messages in the buffer with the stored set of the plurality of received messages in the trace log;
program instructions to update an alert status configuration based on the message logging level associated with each of the plurality of identified messages in the buffer;
program instructions to receive a plurality of subsequent messages from the software program, wherein each of the plurality of subsequent messages includes a message logging level; and
program instructions to record a set of the plurality of received subsequent messages in the trace log by comparing a sum of the updated alert status configuration and a trace configuration level to the message logging level of each of the plurality of received subsequent messages.

7. The computer program product of claim 6, further comprising:
program instructions to record a second set of the plurality of received messages in the trace log based on the updated alert status configuration, a trace configuration level, and the message logging level of each of the plurality of received messages.

8. The computer program product of claim 6, wherein the received plurality of messages includes at least one of a message scope, a timestamp, a plurality of message text, and a program status associated with the software program.

9. The computer program product of claim 6, wherein the buffer is a first-in-first-out buffer that temporarily stores each of the plurality of received messages.

10. The computer program product of claim 6, wherein updating the alert status configuration further comprises:
program instructions to increase the alert status configuration for a preconfigured time period; and
program instructions to reduce the alert status configuration upon an expiration of the preconfigured time period using an alert reducer.

* * * * *